United States Patent
Haase

(10) Patent No.: US 9,233,575 B2
(45) Date of Patent: Jan. 12, 2016

(54) METHOD AND APPARATUS FOR A PASSIVE VEHICLE WHEEL SHUTTER SYSTEM

(71) Applicant: Charles Stephen Haase, Delaware, OH (US)

(72) Inventor: Charles Stephen Haase, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 14/023,070

(22) Filed: Sep. 10, 2013

(65) Prior Publication Data

US 2015/0069822 A1   Mar. 12, 2015

(51) Int. Cl.
| | |
|---|---|
| B60K 25/02 | (2006.01) |
| B60B 7/00 | (2006.01) |
| B60B 1/06 | (2006.01) |
| B60B 7/04 | (2006.01) |
| B60B 7/06 | (2006.01) |

(52) U.S. Cl.
CPC ... *B60B 7/00* (2013.01); *B60B 1/06* (2013.01); *B60B 7/002* (2013.01); *B60B 7/04* (2013.01); *B60B 7/065* (2013.01); *B60B 2900/1216* (2013.01); *B60B 2900/513* (2013.01)

(58) Field of Classification Search
CPC ...... B60B 19/00; B60B 19/10; B60B 7/0086; F16D 65/807; F16D 65/847
USPC ........ 301/6.3, 37.101, 37.25, 37.106, 37.107, 301/37.108
See application file for complete search history.

(56) References Cited

U.S. PATENT DOCUMENTS

| | | | |
|---|---|---|---|
| 4,593,953 A | 6/1986 | Baba et al. | |
| 7,661,766 B2 | 2/2010 | Davis et al. | |
| 8,801,107 B2 * | 8/2014 | Schmid et al. | 301/37.107 |
| 2007/0246996 A1 * | 10/2007 | Footit | 301/37.108 |
| 2009/0195053 A1 | 8/2009 | Kruse et al. | |
| 2013/0313889 A1 | 11/2013 | Schmid et al. | |

FOREIGN PATENT DOCUMENTS

| | | |
|---|---|---|
| DE | 102009057165 A1 | 6/2011 |
| EP | 1319526 A2 | 6/2003 |
| FR | 2699453 A1 | 6/1994 |
| FR | 2886214 A1 | 12/2006 |
| KR | 20070062315 A | 6/2007 |
| KR | 20090063687 A | 6/2009 |
| WO | 2011128037 A1 | 10/2011 |

* cited by examiner

*Primary Examiner* — John Walters
*Assistant Examiner* — James Triggs
(74) *Attorney, Agent, or Firm* — Armstrong Teasdale LLP

(57) ABSTRACT

A method and system for a vehicle wheel are provided. The vehicle wheel includes a circular hub, a concentric rim circumscribing the hub, a plurality of circumferentially spaced-apart spokes extending radially between the hub and rim, each pair of adjacent spokes having an opening therebetween extending at least partially between the rim and hub, and a shutter assembly coupled to the wheel, the shutter assembly including at least one shutter coupled to a closure mechanism that includes a biasing mechanism configured to bias the at least one shutter toward a first relatively open position when the wheel is rotated at less than a predetermined speed.

19 Claims, 4 Drawing Sheets

METHOD AND APPARATUS FOR A PASSIVE VEHICLE WHEEL SHUTTER SYSTEM

BACKGROUND OF THE DISCLOSURE

This description relates to vehicle wheels, and, more particularly, to a method and apparatus for reducing air turbulence proximate the spokes of a vehicle wheel.

Controlling airflow around the wheels of a vehicle may be a way to increase the vehicle's overall efficiency and fuel economy. For example, fixed (i.e., always closed) covers or shields are available that increase the aerodynamics of a vehicle's wheels. However, such covers are considered by some to be visually less appealing than less efficient wheel designs. Also, because the covers are fixed, they may reduce the airflow to the brakes and other components behind the wheels. To provide aerodynamic wheels, without the negative aesthetics and reduced airflow, active wheel shutters have been proposed. Such active shutters require power to actuate the shutters in response to a speed of the wheel. If the power is provided by batteries, the shutter actuators may not operate properly when the batteries become weak or depleted. At least some known active shutter systems use a sensor to detect the vehicle velocity and as the velocity increases above a predetermined value, for example, 60 mph (97 km/h), the wheel-speed sensors signal a dedicated battery that powers the shutters. The shutters deploy in a fanlike pattern, closing off the openings between the wheel spokes, enabling smooth airflow across the wheels. However, there are many drawbacks to a shutter system powered by batteries and that operate according to a speed signal of the vehicle.

BRIEF DESCRIPTION OF THE DISCLOSURE

In one embodiment, a vehicle wheel includes a circular hub, a concentric rim circumscribing the hub, a plurality of circumferentially spaced-apart spokes extending radially between the hub and rim, each pair of adjacent spokes having an opening therebetween extending at least partially between the rim and hub, and a shutter assembly coupled to the wheel, the shutter assembly including at least one shutter coupled to a closure mechanism that includes a biasing mechanism configured to bias the at least one shutter toward a first relatively open position when the wheel is rotated at less than a predetermined speed.

In another embodiment, a wheel shutter system includes an operating mechanism configured to translate from a first position to a second position using a centripetal force acting on the operating mechanism, and a shutter mechanically coupled to the operating mechanism and configured to adjust an amount of an opening of an aperture in a web of a vehicle wheel when the operating mechanism translates between the first and second positions.

In yet another embodiment, method of streamlining a wheel includes forming a radially extending groove from proximate a hub of the wheel to proximate a rim of the wheel, slidably engaging a guide pin into the groove, the guide pin translatable in the groove from a first position proximate the hub to a second position proximate the rim, and coupling a shutter to the pin, the shutter circumferentially translatable from a first position corresponding to an open position of a shutter to a second position corresponding to a closed position of the shutter, the shutter configured to at least partially cover an opening in the wheel in the closed position and uncover the opening in the first position, the shutter is configured to translate under the influence of a centripetal force acting on the wheel.

BRIEF DESCRIPTION OF THE DRAWINGS

FIG. 1 is a side elevation view of a wheel assembly of a vehicle (not shown) in accordance with an example embodiment of the present disclosure.

FIG. 2 is a side elevation view of the wheel assembly illustrating the shutters in a relatively closed position.

FIG. 3 is a perspective view of the wheel assembly looking outward at the inside facing surface of the wheel assembly.

FIG. 4 is a perspective view of the wheel assembly looking outward at the inside facing surface of the wheel assembly with shutter in the second closed position.

FIG. 5 is a cross-sectional view of the wheel assembly in accordance with another example embodiment of the present disclosure.

FIG. 6 is a cross-sectional view of the wheel assembly in accordance with another example embodiment of the present disclosure.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of the invention by way of example and not by way of limitation. It is contemplated that the invention has general application to embodiments of improving machinery efficiency in industrial, commercial, and residential applications. Although illustrated in the context of a vehicle wheel, embodiments of the present disclosure are applicable to other forms of rotatable equipment, such as, but, not limited to electrical machines including motors and generators.

The following description refers to the accompanying drawings, in which, in the absence of a contrary representation, the same numbers in different drawings represent similar elements.

Figure 1:
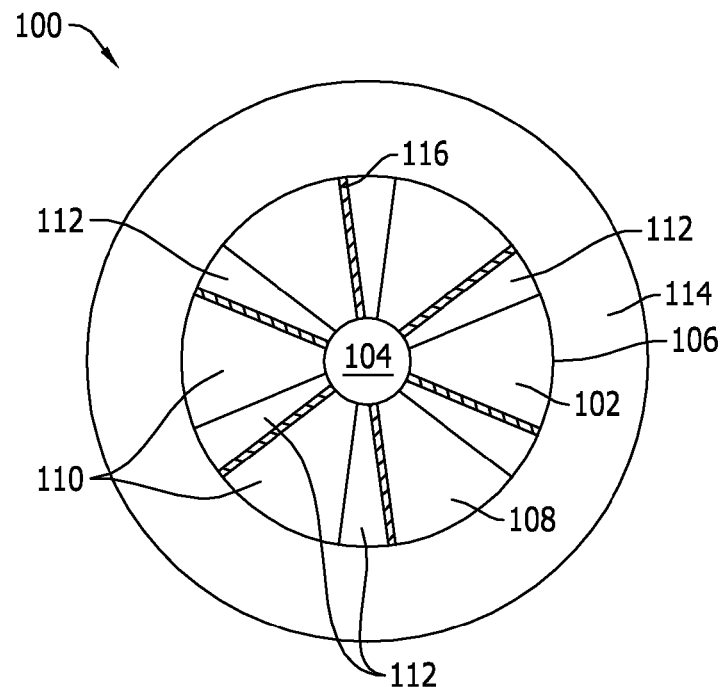
FIGS. 1-6 show exemplary embodiments of the method and apparatus described herein.

FIG. 1 is a side elevation view of a wheel assembly 100 of a vehicle (not shown) in accordance with an example embodiment of the present disclosure. In the example embodiment, wheel assembly 100 includes a wheel 102 that includes a hub 104, a rim 106, and a web 108 extending therebetween. In various embodiments, web 108 is embodied in a plurality of spokes 110 spaced circumferentially about web 108 and separated by openings 112. For example, each of openings 112 may be defined between adjacent spokes 110 and may extend at least partially between rim 106 and hub 104. Rim 106 may include a flange 113 (shown in FIG. 3) that extends generally orthogonally away from rim 106. A tire 114 typically circumscribes wheel assembly 100 and is coupled to wheel assembly 100 by a bead (not shown in FIGS. 1 and 2) formed on tire 114 and a complementary groove or bead seat (not shown in FIGS. 1 and 2) formed in rim 106 or flange 113.

During operation, airflow through openings 112 may cause aerodynamic drag on the wheels reducing an overall efficiency of the vehicle. Typically, the greater the speed of the vehicle is, the greater the drag on the vehicle. Wheel assembly 100 includes one or more shutters 116 configured to deploy in the space of openings 112 to block airflow through openings 112 and reduce the drag on the vehicle, which improves efficiency. In the example embodiment, shutters 116 are deployable using a centripetal force applied to an operating mechanism (not shown in FIGS. 1 and 2). The operating mechanism is coupled to shutters 116 to cause shutters 116 to cover openings 112 based on a speed of rotation of wheel assembly 100. For example, the faster wheel assembly 100 rotates, the greater the centripetal force is imparted onto the operating mechanism, which permits the operating mechanism to move shutters faster, close opening 112 more completely, and/or resist a higher bias toward opening shutters 116. Shutters 116 are typically biased in the open direction to open shutters 116 when the speed of rotation of wheel assembly 100 decreases below a threshold range.

Figure 2:
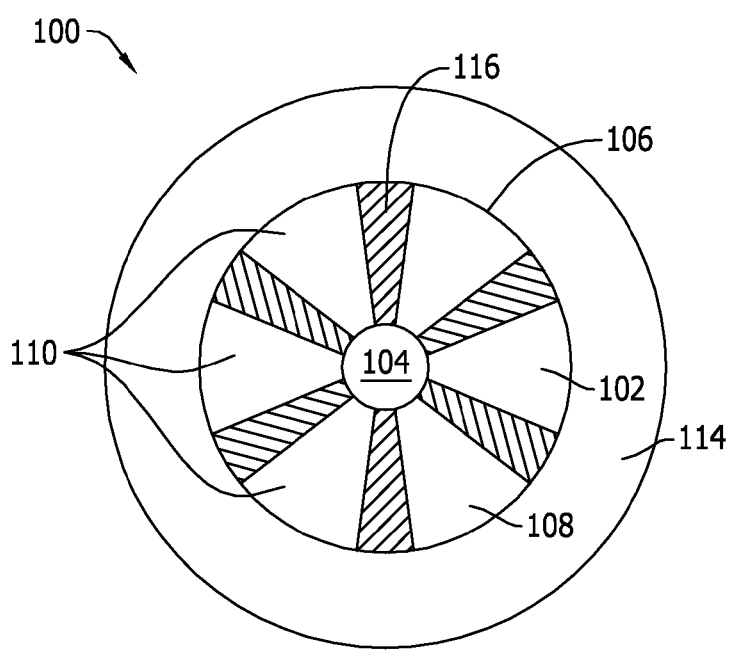

FIG. 2 is a side elevation view of wheel assembly 100 illustrating shutters 116 in a relatively closed position.

Figure 3:
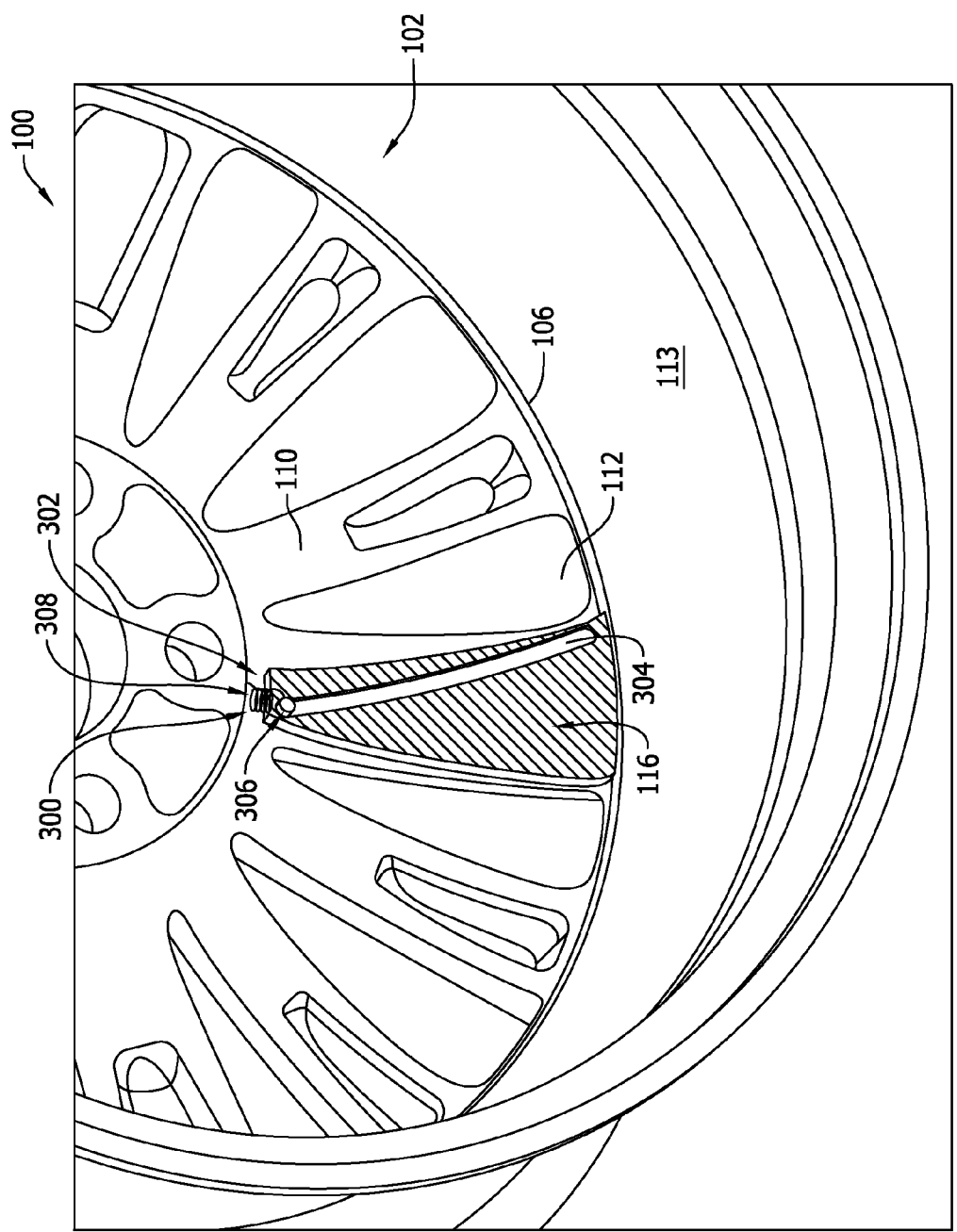

FIG. 3 is a perspective view of wheel assembly 100 looking outward at the inside facing surface of wheel assembly 100. In the example embodiment, wheel assembly 100 includes a shutter assembly 300 coupled to wheel assembly 100. Although only one shutter assembly is shown in FIG. 3, it is contemplated that multiple shutter assemblies will be included such that each opening 112 is associated with a respective shutter assembly 300. Shutter assembly 300 includes at least one shutter 116 coupled to a closure mechanism 302 that includes a guide groove 304 extending from proximate hub 104 to proximate rim, and a guide pin 306 configured to translate through at least part of guide groove 304 under a centripetal force imparted onto pin 306 by a rotation of wheel assembly 100 at a predetermined speed. Shutter assembly 300 also includes a bias member 308 such as, but not limited to a spring coupled to pin 306 or a component coupled to pin 306.

Components included in shutter assembly 300 are positioned as shown in FIG. 3 when wheel assembly 100 is still or rotating at a relatively slow speed. Pin 306 is in guide groove 304 at a first position relatively close to hub 104. Bias member 308 is able to overcome any centripetal force acting on pin 306 at the relatively slow speed. As the rotating speed of wheel assembly 100 increases, the centripetal force acting on pin 306 or other components of shutter assembly 300 increases causing pin 306 to move radially outward from the first position. Shutter assembly 300 may include a detent or stop that prevents pin 306 from moving until the centripetal force increase to a sufficient predetermined force to overcome the additional friction or interference caused by the detent or stop. For example, groove 304 and/or pin 306 may include protuberances or a rough surface treatment that serves to present a greater friction or interference to the translation of pin 306 to a second position. When pin 306 attains the second position, shutter 116 is in a fully closed state, blocking substantially all air from flowing through opening 112. Wheel assembly 100 may include a fairing, or airfoil that directs air or uses airflow to increase a force acting on shutter assembly 300 to aid pin 306 to translate through groove 304.

In various embodiments, shutter assembly 300 includes a plurality of shutters 116 ganged together such that they operate simultaneously or sequentially when pin 306 translates between the first position and the second position. Shutter assembly 300 may include a plurality of grooves 304 and a plurality of pins 306 each associated with a single shutter 116 or may include more than one groove 304 and pin 306 for each shutter 116.

Figure 4:
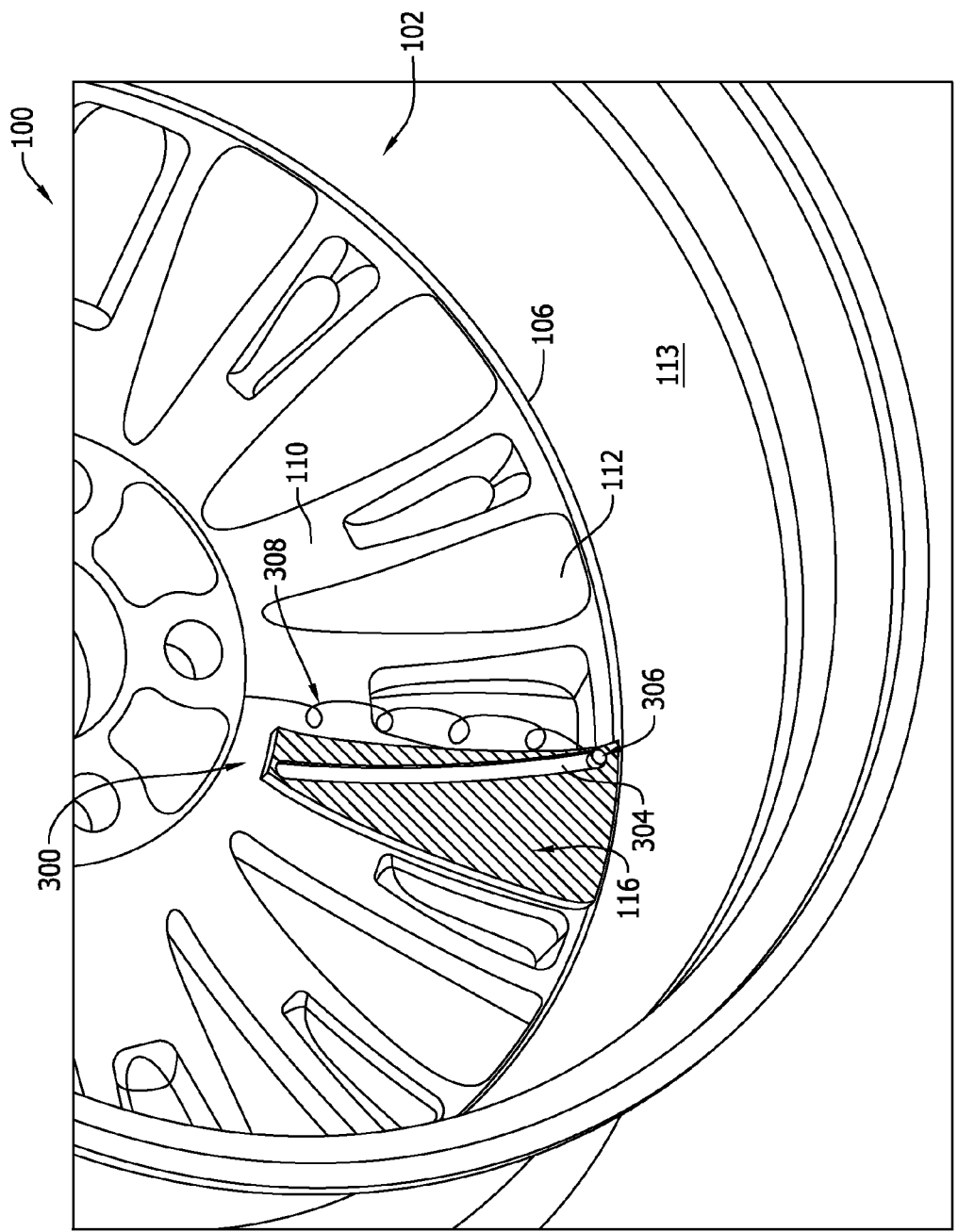

FIG. 4 is a perspective view of wheel assembly 100 looking outward at the inside facing surface of wheel assembly 100 with shutter 116 in the second closed position. Components included in shutter assembly 300 are positioned as shown in FIG. 4 when wheel assembly 100 is rotating at a speed that is greater than a predefined threshold speed.

Figure 5:
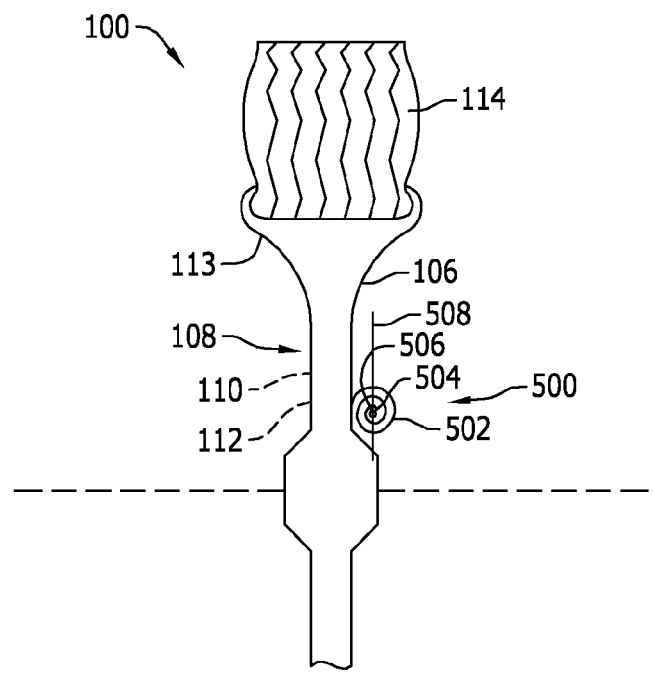

FIG. 5 is a cross-sectional view of wheel assembly 100 in accordance with another example embodiment of the present disclosure. In this embodiment, a shutter 500 includes a coil wound body 502 that includes a winding axis 504. A pin 506 coincident with axis 504 may engage a radially extending groove 508 formed on either side of openings 112 between spokes 110. As wheel assembly 100 rotates at a faster rate during operation, the centripetal force acting on body 502 causes shutter 500 to overcome a bias extend from a normally coiled position proximate hub 104 to a second relatively unwound position wherein shutter 500 substantially eliminates airflow through openings 112. As the rotational motion of wheel assembly 100 slows, the bias of shutter 500 towards the coiled position overcomes the centripetal force and shutter 500 returns to the coiled position where openings 112 are relatively open allowing airflow through openings 112.

Figure 6:
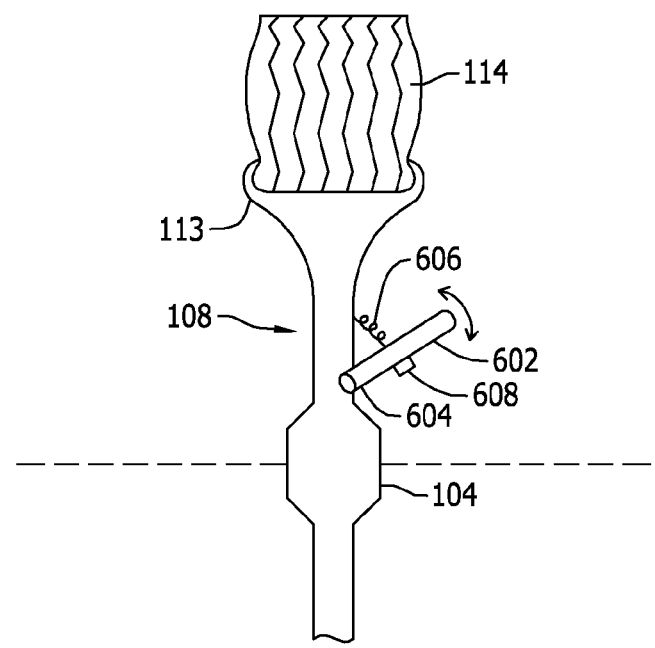

FIG. 6 is a cross-sectional view of wheel assembly 100 in accordance with another example embodiment of the present disclosure. In this embodiment, a shutter 600 includes a flap 602 that pivots about an axis 604. Flap 602 is permitted to pivot from a first position spaced away from web 108 to a second position proximate web 108. In the example embodiment, flap 602 is biased away from web 108 using, for example, but, not limited to, a spring 606. Moreover, to facilitate the centripetal force to overcome spring 606, an additional mass or a weight 608 may be incorporated into flap 602. During operation of this embodiment, shutter 600 moves laterally with respect to web 108 with the centripetal force acting to drive shutter 600 radially outward.

In various embodiments, a spring constant of the bias members used in the various embodiments of the present disclosure may be selected to be substantially constant over the travel of the shutter. In other embodiments, the spring constant may be variable to facilitate the translation of the shutter from the first position to the second position or vice versa. The spring constant may be selected to more closely match expected centripetal forces acting of the shutter or operating mechanism.

It will be appreciated that the above embodiments that have been described in particular detail are merely example or possible embodiments, and that there are many other combinations, additions, or alternatives that may be included.

The above-described embodiments of a method and system of streamlining an aerodynamic profile of a rotatable member such as a vehicle wheel provides a cost-effective and reliable means for using natural forces to operate a shutter to block or close-off openings between the spokes of the wheel. More specifically, the methods and systems described herein facilitate using a radially outwardly directed centripetal force to move the shutter circumferentially, radially, or laterally. In addition, the above-described methods and systems facilitate aiding the movement of the shutter using airflow or additional mass to overcome a bias toward the position representing a more open position of the shutter. As a result, the methods and systems described herein facilitate improving the overall efficiency of a vehicle in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A vehicle wheel comprising:
    a circular hub;
    a concentric rim circumscribing the hub;
    a guide groove extending from proximate the hub to proximate the rim;
    a plurality of circumferentially spaced-apart spokes extending radially between the hub and rim, each pair of adjacent spokes defining an opening therebetween extending at least partially between the rim and hub; and
    a shutter assembly coupled to the wheel, the shutter assembly including:
        at least one shutter coupled to a closure mechanism that includes a biasing mechanism configured to bias the at least one shutter toward a first relatively open position when the wheel is rotated at less than a predetermined speed; and
        a guide pin configured to translate through at least part of the guide groove under a centripetal force imparted onto the pin by a rotation of the wheel at a predetermined speed.

2. The wheel of claim 1, wherein the pin is coupled to the at least one shutter, the shutter configured to at least partially cover at least one opening when the pin translates from the first position to a second position.

3. The wheel of claim 1, wherein the pin is biased toward the first position.

4. The wheel of claim 1, wherein the pin is biased toward the first position by a spring mechanism.

5. The wheel of claim 1, wherein the shutter assembly includes a plurality of grooves and a plurality of pins each associated with a single shutter.

6. The wheel of claim 1, wherein the at least one shutter moves circumferentially as a result of the pin translating from the first position to the second position.

7. The wheel of claim 1, wherein the centripetal force is aided by a flow of air about the wheel.

8. The wheel of claim 1, wherein the shutter moves circumferentially as the pin moves radially under the influence of the centripetal force.

9. The wheel of claim 1, wherein the shutter moves radially outward under the influence of the centripetal force.

10. The wheel of claim 1, wherein the shutter assembly includes a plurality of shutters ganged together such that they operate simultaneously or sequentially when the shutter assembly translates between the first position and a second relatively closed position.

11. A wheel shutter system comprising:
    an operating mechanism configured to translate from a first position to a second position using a centripetal force acting on the operating mechanism;
    a shutter mechanically coupled to the operating mechanism and configured to adjust an amount of an opening of an aperture in a web of a vehicle wheel when the operating mechanism translates between the first and second positions; and
    a guide pin slidably engaged with a radially extending guide groove, the pin coupled to the shutter such that an increase in centripetal force on the pin slides the pin along the groove and the shutter from a relatively open position to a relatively closed position.

12. A wheel shutter system comprising:
    an operating mechanism configured to translate from a first position to a second position using a centripetal force acting on the operating mechanism; and
    a shutter mechanically coupled to the operating mechanism and configured to adjust an amount of an opening of an aperture in a web of a vehicle wheel when the operating mechanism translates between the first and second positions, wherein the operating mechanism includes a radially extendible shutter positioned proximate a radially inner hub of a web in a relatively open position, the shutter configured to extend over the opening when a centripetal force acting on the mechanism exceeds a predetermined range.

13. The system of claim 12, wherein the radially extendible shutter includes a coiled shutter portion configured to unroll from the relatively open position to a relatively closed position.

14. A wheel shutter system comprising:
    an operating mechanism configured to translate from a first position to a second position using a centripetal force acting on the operating mechanism; and
    a shutter mechanically coupled to the operating mechanism and configured to adjust an amount of an opening of an aperture in a web of a vehicle wheel when the operating mechanism translates between the first and second positions, wherein the operating mechanism includes a flap rotatable about a pivot positioned proximate a hub of the web.

15. The system of claim 14, wherein the mechanism is biased in an open position.

16. The system of claim 14, wherein the mechanism includes a counterweight configured to increase a closing force on the flap.

17. A method of streamlining a wheel, the method comprising:
    forming a radially extending groove from proximate a hub of the wheel to proximate a rim of the wheel;
    slidably engaging a guide pin into the groove, the guide pin translatable in the groove from a first position proximate the hub to a second position proximate the rim; and
    coupling a shutter to the pin, the shutter circumferentially translatable from a first position corresponding to an open position of a shutter to a second position corresponding to a closed position of the shutter, the shutter configured to at least partially cover an opening in the wheel in the closed position and uncover the opening in the first position, the shutter is configured to translate under the influence of a centripetal force acting on the wheel.

18. The system of claim 17, wherein forming a radially extending groove from proximate a hub of the wheel to proximate a rim of the wheel comprises forming a radially extending groove in a spoke of the wheel.

19. The system of claim 17, further comprising ganging a plurality of shutters together such that the plurality of shutters operate substantially simultaneously or sequentially when translating between the first and second positions.

* * * * *